(No Model.)
A. ARGO.
CAR BRAKE.
No. 367,947. Patented Aug. 9, 1887.
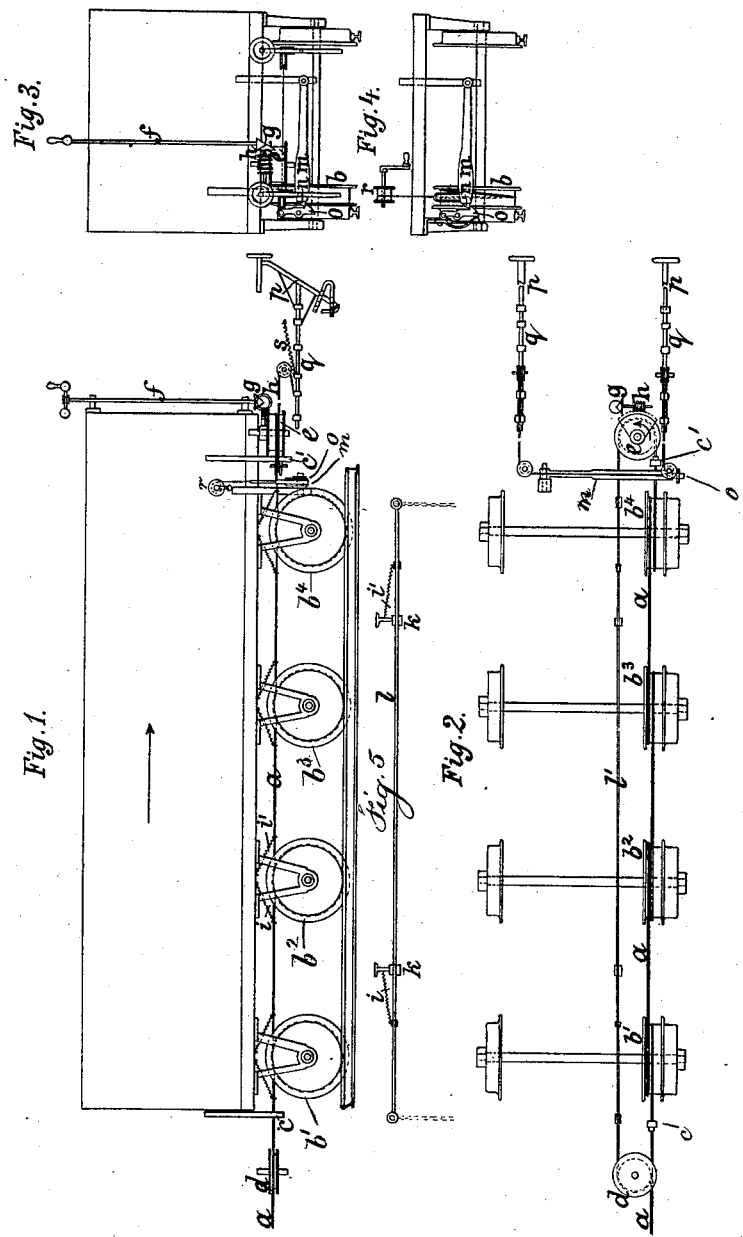
Witnesses
Chas. H. Smith
J. Staily
Inventor
Adolph Argo.
per Lemuel W. Serrell
atty

UNITED STATES PATENT OFFICE.

ADOLPH ARGO, OF CHEMNITZ, SAXONY, GERMANY.

CAR-BRAKE.

SPECIFICATION forming part of Letters Patent No. 367,947, dated August 9, 1887.

Application filed May 3, 1886. Serial No. 200,954. (No model.)

*To all whom it may concern:*

Be it known that I, ADOLPH ARGO, of Chemnitz, Kingdom of Saxony, German Empire, have invented a new and useful Improvement in Brakes, of which the following is a specification.

The quick and effective action of the brake, according to this invention, is based on the arrangement upon one, several, or all of the car-axles of one or several disks, of the same, or almost the same, diameter of the car-wheels, and by surrounding the periphery of each disk by a rope, band, or chain, common to all, which rope is to be pulled at one end for setting the brake in motion, or, in other words, for causing the brake action. According to the arrangement of parts in this invention, the rope will be tightened fast, first around the disk on the hind axle and thereafter around the disk on the front axle, or with cars with more than two axles in consecutive order from the hind axle to the front axle, so as to bring the car to a standstill in the shortest time possible. There may be in one train any desired number of cars fitted with such brakes. The brakes of all cars may be worked from one point—say from the stand of the engine-driver—if proper connections are applied between the cars fitted with such brake devices.

In order to cause the brake to act from the hind part of the car to its front part, it is necessary that the brake-rope, which surrounds each disk or pulley, shall be attached to a fixed point at the hind part of the car, which enables the rope to be pulled tight. The rope needs only to be pulled to a very small extent, as the rope will immediately tightly surround the hind pulley and act as a brake, and thereafter consecutively tightly surround the other wheels in front, acting on all of them as a brake in such short period that the turning of the wheels will very quickly cease. As the cars run in both directions, the above-mentioned rests or fixed points of the ropes must be at both ends of the car so as to be able to brake the wheels in both directions. If the brake-rope runs throughout the entire length of the train, these rests or fixed points need only to be provided at both ends of the train.

The braking action will prove to be very quick and very effective for this reason, because the clamp of the braking is upon the most favorable point and to the largest possible extent—that is to say, the rope in each car surrounds the peripheries, which are equal or almost equal to the sum of peripheries of wheels of a car. From this arrangement, and from the fact that the braking action takes place consecutively on all the peripheries in a very short time, this braking action is without jerks, and most favorable for the rolling-stock and for the passengers.

It is a remarkable feature of this improved brake that for the regular stopping of a train, as well as for sudden stoppage in case of accidents, there is only required a very slight action of the brakeman, or a very slight automatic action to give the impetus motion necessary to bring the brake into action, this movement once given by a short pull of the brake-rope applied, the braking action proper will be caused by the periphery of the disk next to the pull beginning to revolve its rope-ring by friction, thereby automatically pulling the rope from the rear part. This tightening of the rope on the several disks will take place nearly at one time, although in consecutive or successive order, until the rear or hind disk is braked by the tight rope, in which moment the proper braking action, in reverse order— viz., from the hind axle to the front axle—will immediately take place.

Figure 1 is a side view illustrating my improvements as applied to a car with four pairs of wheels. Fig. 2 is a plan of the pairs of wheels and brake devices. Fig. 3 is an end elevation of the devices on a box-car. Fig. 4 is an end elevation of the devices for a platform-car, and Fig. 5 is a separate view of the connecting-rod between the cars.

*a* is the rope (band, strap, chain, &c.,) laid around each disk or pulley *b*, once or in several coils. Each brake-disk is shown on the drawings as constituting one part with the wheel. It may, however, be separated from the wheel, and one or more separate disks may be fitted and fixed to each axle, or each wheel may be fitted with such a disk.

*c c'* are movable bars pierced by holes and fixed to the car body or truck. At the outside of these bars the rope is provided with a knot or similar projection, so that the rope, if pulled in either direction, will find a rest or fixed point against one of the bars. The rope *a*, in order to be used as a brake for a single car, may be combined with a drawing-bar, *l'*, under the car, the rope being connected to the bar by any convenient parts, partly surrounding the roller *d* and the disk *e*, so that the turning of such disk *e* to a small extent in either direction, according to the direction of traveling, may pull the rope *a* at the front or at the rear end of the car.

The disk *e* may be turned by a spindle, *f*, with crank, either directly or by means of intermediate gearing or screw-and-worm connections *g h*. Supposing, now, the car running in the direction of the arrow, Fig. 1, the disk *e* for setting the brake to work must receive a small turn in the direction of its arrow, Fig. 2. This turning will in the first instance cause the rope around the disk $b'$ to be tightened in such manner that the periphery of $b'$ will draw on the rope or chain by friction, and this pull upon the rope will thereby be extended and the rope be tightened around all disks from $b^3$ to $b'$, and the rope will be stopped with knot or projection against the bar *c* at the rear, at which moment the braking action will take place upon disks $b'$ $b^2$, and so on around all. This action is so rapid that the brakes are virtually applied at the time the crank and shaft on spindle *f* are moved. When the turning of the wheels and disks ceases, the springs *i* and *i'*, that have been expanded by the pull of the rope, contract and loosen the rope around the brake-disks.

If this brake device is to be applied to a train, and is intended to be worked from one point, the rope of one car is connected to the rope of the next—that is to say, one rope running through the entire length of train—and in this instance the bars *c c'* of each and all the intermediate cars are removed by shifting or otherwise, and there are only two bars or fixed points, one at each end of train. If cars are running in the train without brakes, they may be coupled with the next brake or car by means of the bar *l*, Fig. 5, guided at *k k*, provided with springs *i i'*, which move the bar to its original position after the brake action.

In order to set the brake in motion in case of accidents or irregularities, which cause one car to move toward the other, a weight, *m*, may be applied either to the locomotive or to the cars, or to one or all of them, which is preferably placed in front of the vehicle—viz., to the front face of the vehicle, Figs. 3 and 4. This weight is pivoted at one end, and supported at its other end by means of a nose, *n*, and a latch, by which it is held. At this end the weight is connected to the rope *a*. If, now, any obstacle presents itself on the rails to the cleaner, or if for any other cause the buffers are made to strongly recede, (the buffers being shown separately from the car in Figs. 1 and 2, for clearness sake,) the latch *o*, by means of rod *p* and bar *q*, which are made subject to motion if the cleaners or the buffers recede, will unlock the weight *m*, which in dropping at this end will pull the rope *a*, thereby causing the braking motion in the same manner as if started by crank-spindle *f* and disk *e*.

Roller *r*, Fig. 4, indicates a device for raising the levers *m* to catch the latch *o*; the rod *p* and bar *q* having reassumed their former positions under the action of spring *s* latch *o* will also return to catch the lifted weight *m*. By means of weight *m* facilities are afforded to bring the brakes into action from the interior of each railway-car in cases of accidents.

I claim as my invention—

1. The combination, with the revolving shaft, of a grooved disk, a rope or chain passing around the same, a spring or springs to loosen the rope or chain passing around the disk, and mechanism, substantially as specified, for drawing the rope or chain into contact with the disk, to form a friction-brake for stopping the shaft, substantially as set forth.

2. The combination, with the revolving shaft and a grooved disk upon the same, of a rope or chain passing around the grooved disk, a weight to tighten such rope or chain, and mechanism, substantially as specified, for controlling the action of the weight, substantially as set forth.

In testimony that I claim the foregoing as my invention I have signed my name in presence of two subscribing witnesses.

ADOLPH ARGO.

Witnesses:
PAUL DRUCKMÜLLER,
WILHELM WIESENHÜTTER.